June 15, 1943.    R. S. FOX    2,321,903
SCREW THREAD LEAD TESTING MACHINE
Filed July 28, 1941    3 Sheets-Sheet 1

INVENTOR
RAYMOND S. FOX
BY Joseph V. Schofield
ATTORNEY

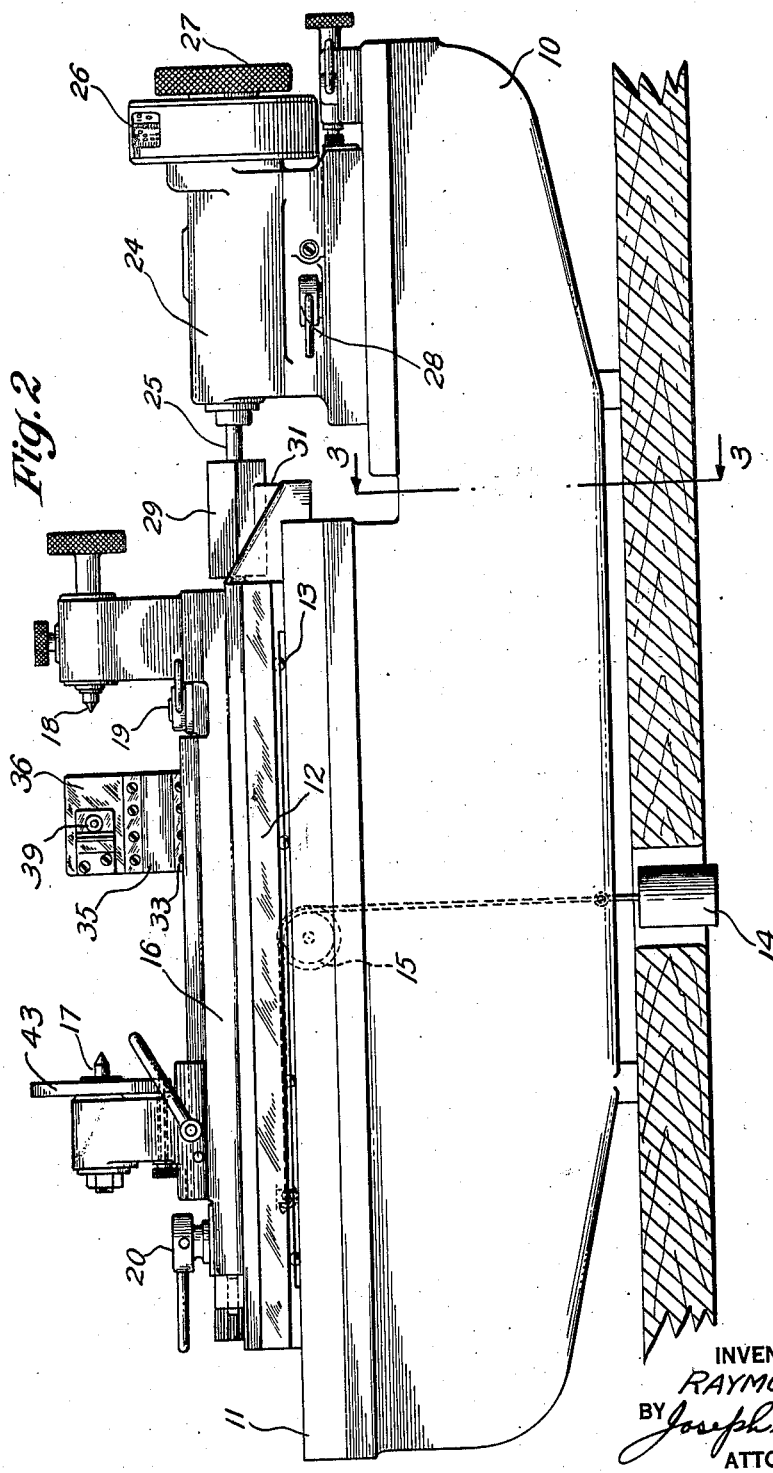

June 15, 1943.  R. S. FOX  2,321,903
SCREW THREAD LEAD TESTING MACHINE
Filed July 28, 1941  3 Sheets-Sheet 3
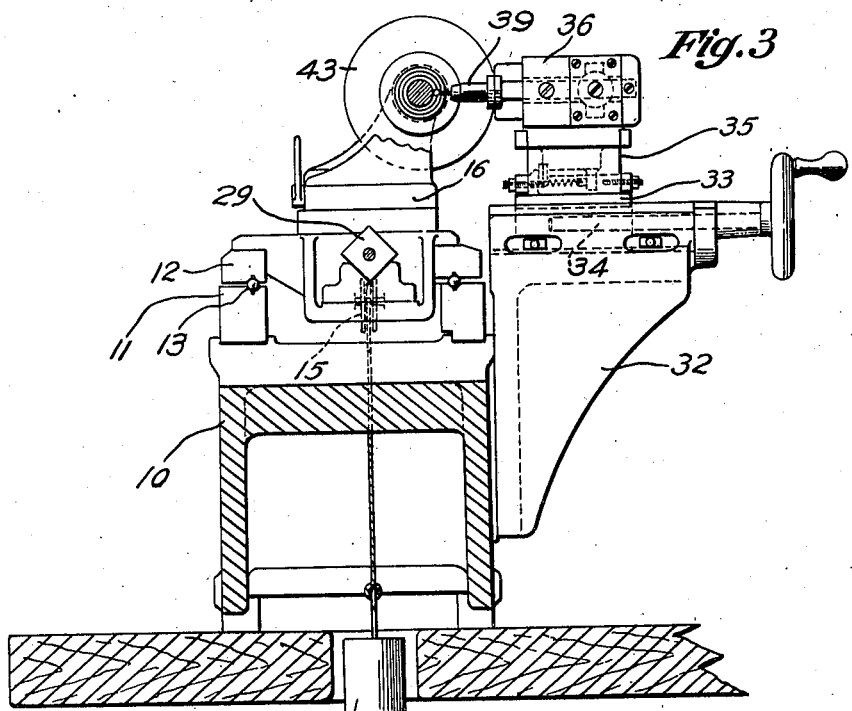
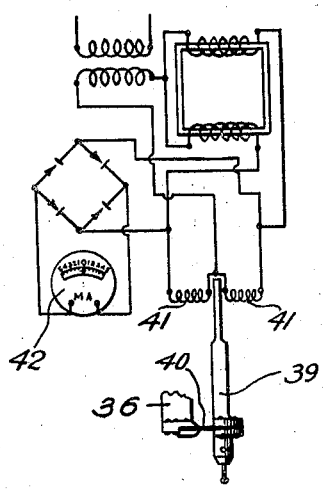
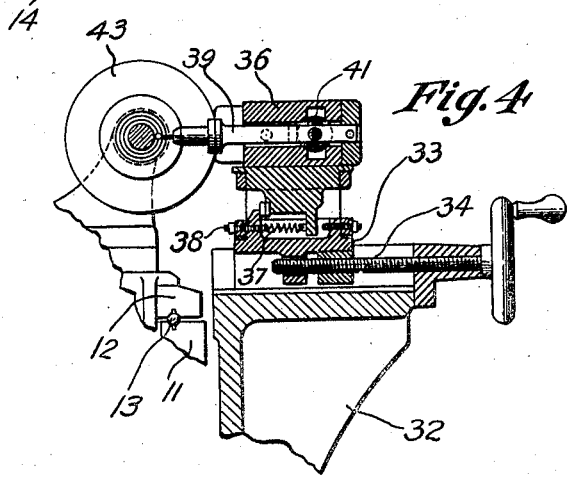
INVENTOR
RAYMOND S. FOX
BY Joseph H. Schofield
ATTORNEY Patented June 15, 1943

2,321,903

UNITED STATES PATENT OFFICE 2,321,903

SCREW THREAD LEAD TESTING MACHINE

Raymond S. Fox, West Hartford, Conn., assignor to Niles-Bement-Pond Company, West Hartford, Conn., a corporation of New Jersey Application July 28, 1941, Serial No. 404,287

3 Claims. (Cl. 33—199)

This invention relates to testing machines and particularly to a machine for testing the correctness of the lead or pitch of external screw threads.

An object of the invention is to provide a precision testing machine for determining the correctness of the lead of screw threads that may be conveniently operated and adapted for external screw threads varying widely in diameter and lead.

It is also an object of the present invention to provide means for testing the lead or pitch of tapered screw threads, the work supporting members for a specimen being adjustable angularly to accommodate various types of tapered threads.

And finally it is an object of the invention to apply an electromagnetic bridge circuit connected to an electric indicator to determine the position of screw thread engaging finger of the machine when in successive operative or gaging positions.

With the above and other objects in view, the invention includes the features of construction and operation set forth in the following specification and illustrated in the accompanying drawings.

In the accompanying drawings annexed hereto and forming a part of this invention, I have shown the invention embodied in a bench type lead or pitch testing machine for screw threads, but it will be understood that the invention can be otherwise embodied and that the drawings are not to be construed as defining or limiting the scope of the invention, the claims appended to this specification being relied upon for that purpose.

In the drawings:

Fig. 2 is a front elevation of a complete testing machine made in accordance with the present invention.

Fig. 3 is an end elevation of the machine shown in Figs. 1 and 2 taken on the plane of line 3—3 in Fig. 2.

Fig. 4 is a transverse sectional view of some of the parts shown in Fig. 3, and

Fig. 5 is a diagram showing the electrical circuits for determining the position of the screw thread engaging member.

Figure 1:
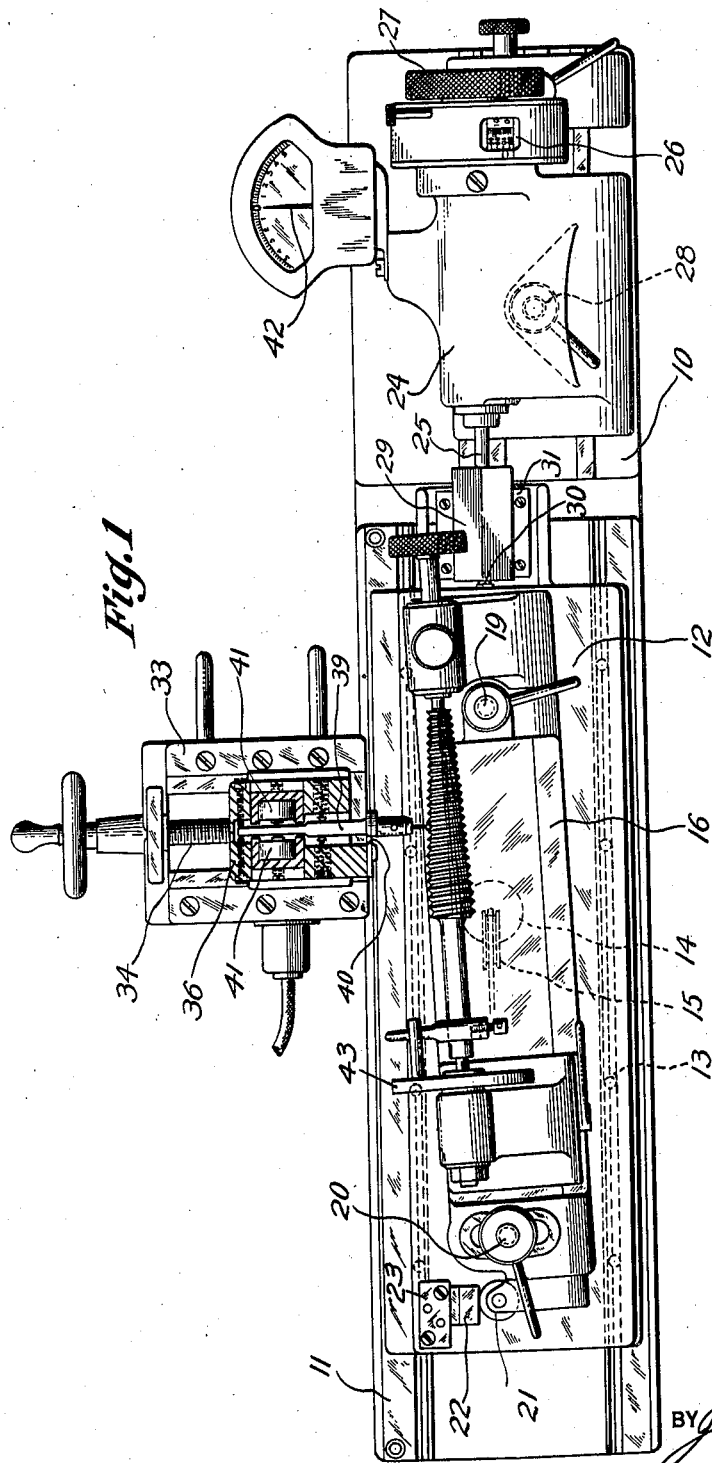
Figure 1 is a complete plan view of the testing machine partly in section showing a tapered screw thread member in position for testing.

In the above mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a base; second, a carriage or table thereon slidably mounted for longitudinal movement along the base; third, precision means at one end of the base for determining successive positions of the carriage or table on the base during the gaging operation; fourth, an angularly adjustable member on the carriage or table for supporting the work piece in predetermined angular relation to the direction of motion of the carriage or table; fifth, a transversely movable head having a flexibly mounted engaging lever therein, one end of which is provided with a screw thread engaging end and its opposite end forms an armature disposed between opposed induction coils of a bridge circuit by means of which the angular displacement from a central position of the lever when in engagement with the screw thread being tested may be determined to a high precision.

Referring more in detail to the figures of the drawings, there is provided a base 10 having longitudinal horizontal ways 11 on which may be supported a carriage or table 12. Preferably and as shown in the figure, suitable ball races 13 are provided between the base 10 and carriage 12 so that the carriage may slide longitudinally along the base with a minimum of friction. A counter-weight 14 is provided attached to the carriage 12 adjacent its left-hand end and supported over a pulley 15 in the base so that the carriage is normally forced with a light pressure toward the right end of the testing machine as seen in Figs. 1 and 2.

Mounted on the upper surface of the carriage 12 on a swivelling or pivotally mounted member 16 are heads having work supporting centers 17 and 18 therein. One of these heads in which center 18 is mounted may, as shown, be fixed in position and the head mounting the opposite center 17 may be slidable along suitable ways on the member to accommodate work pieces of widely varying length. This work supporting member 16 is, as shown, pivotally mounted about the axis of a stud or shaft 19 near one end and may be clamped in position at its opposite end in any angular adjustment by means of a clamping screw 20. In order to determine the angle at which this member 16 is adjusted, its left-hand end may be provided with a suitable roller 21 at a precisely known distance from the axis of the pivot 19. This roller 21 engages against one of a series of precision gage blocks 22 built up to a predetermined thickness. By selecting the proper thickness of these gage blocks 22 between an abutment 23 provided on the carriage 12, the work supporting member 16 can be adjusted obliquely within extremely close limits to predetermined angles.

Mounted at the right-hand end of the base 10 is the headstock 24 of a standard measuring machine having a longitudinally movable spindle 25 mounted within the headstock, the longitudinal position of which may be determined by suitable dials 26 mounted thereon. A hand wheel 27 directly on the spindle 25 provides means for effecting longitudinal adjustments of this spindle 25. Clamping means 28 of any suitable type may be provided by means of which the headstock 24 may be clamped to the base 10 in any desired position. As the construction and operation of this headstock 24 and spindle 25 are similar to those in standard linear measuring machines, it is not thought that further description will be necessary.

Disposed between one end of the carriage 12 and the anvil surface of the measuring machine spindle 25 is a gage block 29, there preferably being a small projection 30 provided on the end of the carriage for engagement with one face of this gage block. The gage block 29, the length of which is selected to properly position the specimen for testing operations, as shown, is mounted within suitable guideways 31 extending longitudinally of the carriage. This block 29 enables the carriage 12 to be positioned longitudinally of the base 10 for screw threads of varying length without varying the position of the measuring machine headstock 24. By using blocks 29 varying by inches the entire length of a screw thread may be tested with a measuring spindle 25 having a one inch travel only.

Supported on a fixed bracket 32 suitably fastened to the rear vertical surface of the base 10 is a transversly movable block 33. This block 33 is slidably mounted upon suitable ways provided on the upper surface of the bracket 32 and may be adjusted to different positions toward or from the axis of the work supporting centers by means of an adjusting screw 34. This block 33 by means of parallel flexible metal strips 35, supports head 36 so that with the transversely movable block 33 in any position the head 36 may be moved limited distances transversely of the axis of the work piece by flexing of these parallel metal strips. By varying the adjustment of the transversely movable block 33, the pressure of the screw thread engaging end of a lever against the specimen being tested may be varied. Normally forcing the head 36 toward the specimen being tested is a tension spring 37 extending between and attached to the head 36 at one end and to an adjusting screw 38 within the block 33 at its opposite end.

Mounted in this flexibly supported head 36 is a lever 39 which may oscillate about a flexible vertically disposed steel strip 40 as will be clearly seen in Fig. 1. By means of this flexible strip 40 the lever 39 may move angularly in a horizontal plane in either direction from a central position normal to the direction of movement of the carriage 12. At the forward end of this lever 39 a suitable ball or wedge may be provided for engagement within a groove of the screw threads being tested and the opposite end of this lever forms an armature of magnetic material disposed between two spaced induction coils 41. By reference to the diagram shown in Fig. 5 it will be seen that these coils 41 form a part of a bridge circuit more clearly disclosed in the patent to Mershon 1,928,457, granted September 26, 1933. With this armature end of the lever 39 in variable positions between the two coils 41 occasioned by the adjustment of the lever to the spaces within convolutions of the screw thread being tested the pointer of a milliammeter 42 is varied over its scale. As the circuits and instrument used in this testing machine are similar to those shown and described in the Mershon patent above noted and Terry Patent 2,065,951 granted December 29, 1936, it is not thought that further description will be required.

In operation the specimen to be tested is mounted between the centers 17 and 18 and clamped against rotation at one end by a suitable dog or other suitable means on an index plate 43 of the support for the center. The pivotal work supporting member 16 is then adjusted to the proper oblique position for the taper, if any, of the thread under examination. The carriage 12 is then moved to an initial position where the work piece engaging lever 39 may contact one of the convolutions of the thread preferably near one end. A suitable gage block 29 is inserted between the end face of the slidable carriage 12 and the anvil surface of the measuring machine spindle 25. The spindle 25 is then adjusted until the pointer of the milliammeter 42 stands at zero which preferably is at the center of its scale. The measuring machine spindle 25 is then adjusted to a new position spaced from its first position a distance equal to the lead or pitch of the screw threads and the carriage is again moved against the gage block 29. During this movement of the carriage 12 the work engaging lever 39 is manually withheld from engaging the screw threads. With the carriage 12 adjusted to its new position the lever 39 is allowed to move forwardly into engagement with the screw threads. With successive positions of the carriage and screw thread being tested, variations in the position of the milliammeter pointer are noted. Variations in the positions of this instrument pointer 42 at the various positions of the carriage and specimen under examination when successive positions are chosen for a theoretically correct lead will indicate the variation from the true pitch or lead of the screw threads.

What I claim is:

1. A lead testing machine for screw threads comprising in combination, a base, a carriage slidable thereon, means to support a screw-threaded member thereon with its axis in a plane parallel to the direction of movement of said carriage, means to adjust said screw threaded member angularly in said plane, means on said base to determine the longitudinal position of said table, a head adjustable transversely to the direction of movement of said work table and having limited resilient transverse movement, a work engaging finger flexibly mounted on said head for angular movements in the plane of the axis of the screw threaded member, and means to determine the oscillated position of said finger when in successive work engaging positions.

2. A lead testing machine for screw threads comprising in combination, a base, a carriage slidable thereon, means to support a screw threaded member thereon with its axis in a plane parallel to the direction of movement of said carriage, means to adjust said member angularly in said plane, means on said base to move said carriage to predetermined spaced positions, a head adjustable transversely to the direction of movement of said carriage, a lever mounted thereon for resilient movement directly toward and from said carriage and having a work engaging end, said lever being mounted also for pivotal movement in a plane parallel to the axis of the screw threaded member, and electromagnetic means disposed adjacent the lever opposite its work engaging end to determine the pivotal position of said lever when in its work engaging position.

3. A lead testing machine for screw threads comprising in combination, a base, a carriage slidable thereon, means to support a screw threaded member thereon with its axis in a plane parallel to the direction of movement of said carriage, means to adjust said member angularly in said plane, means on said base to move said carriage to predetermined successive spaced positions, a head adjustable transversely to the direction of movement of said carriage, a lever mounted thereon for resilient movement directly toward and from said work table and having a work engaging end, said lever being mounted also for pivotal movement about an axis normal to the direction of movement of said carriage, and electromagnetic means disposed adjacent the lever opposite its work engaging end to determine the pivotal position of said lever when in its work engaging position.

RAYMOND S. FOX.